(12) United States Patent
Reynolds et al.

(10) Patent No.: US 7,797,138 B2
(45) Date of Patent: Sep. 14, 2010

(54) SYSTEM AND METHOD FOR DESIGNING A SEAT

(75) Inventors: Herbert M. Reynolds, East Lansing, MI (US); Raymond R. Brodeur, Okemos, MI (US)

(73) Assignee: ERL, LLC, Lansing, MI (US)

( * ) Notice: Subject to any disclaimer, the term of this patent is extended or adjusted under 35 U.S.C. 154(b) by 1514 days.

(21) Appl. No.: 11/119,578

(22) Filed: May 2, 2005

(65) Prior Publication Data

US 2005/0242650 A1 Nov. 3, 2005

Related U.S. Application Data

(60) Provisional application No. 60/567,464, filed on May 3, 2004.

(51) Int. Cl.
*G06F 17/50* (2006.01)
(52) U.S. Cl. .................... 703/1; 703/7; 703/8
(58) Field of Classification Search ............ 703/1, 703/6–8; 297/219.12, 392, 397, 399; 73/866.4
See application file for complete search history.

(56) References Cited

U.S. PATENT DOCUMENTS

| | | | |
|---|---|---|---|
| 3,147,617 A | 9/1964 | Kaptur, Jr. et al. |
| 3,778,104 A | 12/1973 | Kusters |
| 3,841,654 A | 10/1974 | Lewis |
| 4,026,041 A | 5/1977 | Kennedy |
| 4,242,802 A | 1/1981 | Jenner et al. |
| 4,335,918 A | 6/1982 | Cunningham |
| 4,578,875 A | 4/1986 | Vertin |
| 4,669,302 A | 6/1987 | Wagner et al. |
| 4,688,853 A | 8/1987 | Watts |
| 4,728,150 A | 3/1988 | Gaudreau, Jr. |
| 4,993,164 A | 2/1991 | Jacobsen |
| 4,998,354 A | 3/1991 | Silverman et al. |
| 5,018,790 A | 5/1991 | Jay |
| 5,058,285 A | 10/1991 | Morita et al. |
| 5,060,393 A | 10/1991 | Silverman et al. |
| 5,193,285 A | 3/1993 | Heinrich et al. |
| 5,235,988 A | 8/1993 | Johnson et al. |

(Continued)

FOREIGN PATENT DOCUMENTS

GB 986093 3/1965

(Continued)

OTHER PUBLICATIONS

Devices for Use in Defining and Measuring Vehicle Seating Accomodation—SAE J826 Apr. 1980.

(Continued)

*Primary Examiner*—Russell Frejd
(74) *Attorney, Agent, or Firm*—Howard & Howard Attorneys PLLC

(57) ABSTRACT

A computer based system and method for establishing one or more patches related to a seat to be designed is provided. The system method establish a set of environment characteristics, a set of interface characteristics, and a pool of body templates. The pool of body templates are representative of target occupants of the seat. The system and method further establish a seat design as a function of the established environment characteristics, interface characteristics, and body templates by defining a plurality of patches.

37 Claims, 6 Drawing Sheets

U.S. PATENT DOCUMENTS

| | | | |
|---|---|---|---|
| 5,375,610 | A | 12/1994 | LaCourse et al. |
| 5,456,019 | A | 10/1995 | Dowell et al. |
| 5,483,825 | A | 1/1996 | Greenbaum |
| 6,113,644 | A | 9/2000 | Weber |
| 6,836,754 | B2 * | 12/2004 | Cooper .......................... 703/8 |
| 6,840,125 | B1 | 1/2005 | Reynolds et al. |
| 7,047,831 | B2 * | 5/2006 | Reynolds et al. ........... 73/866.4 |
| 2002/0014793 | A1 * | 2/2002 | Santha .................. 297/219.12 |

FOREIGN PATENT DOCUMENTS

| | | |
|---|---|---|
| GB | 2333383 | 7/1999 |
| WO | WO03058159 | 7/2003 |
| WO | WO2004069583 | 8/2004 |

OTHER PUBLICATIONS

Spatial Geometry of the Human Pelvis, by H.M. Reynolds, C.C. Snow, J.W. Young, Civil Aeromedical Institute, Mar. 1982.

Geometric Model and Spinal Motions of the Average Male in Seated Postures, by W. Haas, Thesis, Mar./Apr. 1990.

The Use of Electromyography for Seat Assessment and Comfort Evaluation, by T. Bush, F.T. Mills, K. Thakurta, R.P. Hubbard and J. Vorro, International Congress and Exposition, Feb. 1995 (950143).

Selected Design Parameters for Relining Seats Based on Engineering Anthropometry; M.M. Ayoub, S. Deivanayagam; Department of Industrial Engineering Texas Tech University, Lubbock, Texas; Sep. 1977.

An Investigation of Driver Discomfort and Related Seat Design Factors in Extended Duration Driving; Matthew P. Reed, Masatsugo Saito and Yasuo Kakishima, Nahm S. Lee & Lawrence W. Schneider ; International Congress and Exposition , Detroit, MI Feb. 25-Mar. 1, 1991.

Lumbar Support in Auto Seats: Conclusions from a Study of Preferred Driving Posture; Matthew P. Reed and Lawrence W. Schneider International Congress & Exposition, Detroit, MI Feb. 26-29, 1996.

A Kinematic Model of the Human Spine and Torso, Gary Monheit and Norman I. Badler, University of Penn.

Some Effects of Lumbar Support Contour on Driver Seated Posture; Matthew P. Reed, Lawrence W. Schneider and Bethany A. H. Eby; University of Michigan.

Distribution of Automobile Trip Durations for Studies of Seat Comfort; Matthew P. Reed and Dawn L. Massie; University of Mich.; International Congress and Exposition , Detroit, MI Feb. 26-29, 1996.

Spinal Curvature of Young Adult Females; Herbert M. Reynolds, James J. Rechtien, Grayson W. Marshall and Sally Marshall.

Anatomical Frames of Reference and Biomechanics; Herbert M. Reynolds and Robert P. Hubbard; Department of Biomechanics, Michigan State University Human Factors, 1980 22(2) 171-176.

The Influence of Backrest Inclination and Lumbar Support of Lumbar Lordosis; G.B.J. Anderson, MD, PhD; R.W. Murphy, MD, R. Ortengren, PHD; and A.L. Nachemson, MD, PhD.; Spine vol. 4, No. 1 Jan./Feb. 1979.

Lumbar Disc Pressure and Myoelectric Back Muscle Activity During Sitting; IV Studies on a Car Driver's Seat; R.J. G. Anderson, R. Ortengren, A Nachemson and G. Elfstrom; Scand J. Rehab Med 6:128-133, 1974.

A Design Layout and Method for Relating Seating to the Occupant and Vehicle; F.W. Babbs; T.I. Cox; Ergonomics, 1979, vol. 22 No. 2,227-234.

The Driving Seat. Its Adaptation to Functional and Anthropometric Requirement; Royal Aircraft Establishment.

Erect, Neutral and Slump Sifting Postures; A Study of the Torso Linkage System from Shoulder to Hip Joint; Herbert M. Reynolds; Oct. 1994.

Progress with Human Factors in Automotive Design: Seating Comfort, Visibility, and Safety, Published by Society of Automotive Engineers, Inc., Feb. 1997.

Stimulation of Torso Posture and Motion in Seating, by Robert Hubbard, Melissa Gedraitis, and Tamara Bush, presented at the Society of Automotive Engineers, Digital Human Modeling for Design and Engineering Conference and Exposition, Apr. 1998 (981304).

Kinetic Computer Modeling of Human Posture in Automotive Seats, by David F. Ekem et al., Cpyright 1997 Society of Automotive Engineers. Inc., pp. 125-133 (970592).

Biomechanically Articulated Chair Concept and Prototypes, by Robert Hubbard and Christopher Gedraitis, Copyright 1997, Society of Automotive Engineers, Inc., pp. 117-124 (970591).

Development of Human Back Contours for Automobile Seat Design, by Barry L. Frost, III et al., Copyright 1997, Society of Automotive Engineers, Inc., pp. 107-115 (970590).

Measuring and Modeling of Human Soft Tissue and Seat Interaction, by Richard H. Setyabudhy et al., Copyright 1997, Society of Automotive Engineers, Inc., pp. 135-142 (970593).

U.S. Appl. No. 10/035,990, filed Dec. 31, 2001, Applicant: Herbert M. Reynolds, "DESIGN TEMPLATE".

Ekern, D F et al; Kinetic computer modeling of human posture in automotive seats; Society of Automotive Engineers Publications, XX, XX; Jan. 1, 1997.

Examination Report; Jun. 3, 2009.

Supplementary Search Report; Mar. 13, 2009.

* cited by examiner

SYSTEM AND METHOD FOR DESIGNING A SEAT

The present application claims priority to U.S. Provisional Patent Application Ser. No. 60/567,464, filed May 3, 2004, which is hereby incorporated by reference.

FIELD OF THE INVENTION

The present invention relates generally to three dimensional templates for designing and/or evaluating a seat design, and more particular, to three dimensional templates which utilizes one or more patches.

BACKGROUND OF THE INVENTION

Seats, such as automotive vehicle seats have three primary functions: (1) position occupant for the driving task; (2) support comfortable healthy sitting postures; and (3) protect occupant upon vehicle impact. A deformable pad on a mechanically adjustable seat frame accomplishes the first function and the second function is accomplished through the geometrical and mechanical properties of the deformable pad composed of padding, suspension and upholstery. The third function is accomplished by seat and restraint systems to restrain the occupant during a vehicle impact. The first two functions determine the greatest portion of the occupant's perceived level of comfort. Position has been considered a primary determinant of occupant comfort and posture has been relegated to the occupant's ability to adapt to the vehicle environment. A major function of seat position and its supporting surfaces is, however, to support the occupant's posture. Thus, there is a need in the art to provide a design tool for automotive vehicle seats.

A tool which may be used to assist in the design of a seat is disclosed in U.S. Pat. No. 6,840,125. The '125 patent discloses a design template, which may be implemented as a physical template or a computer or virtual tool. The design template has a torso section which has an outer contour which may represent the deformed shape of the seat/occupant interface. However, the design template of the '125 patent does not define the full surface of the seat design for manufacturability or take into account lateral comfort of the seat.

The present invention is aimed at one or more of the problems set forth above.

SUMMARY OF THE INVENTION

In one aspect of the present invention, a computer based method for designing a seat is provided. The method including the steps of establishing a set of environment characteristics, establishing a set of interface characteristics, and establishing a pool of body templates. The pool of body templates are representative of target occupants of the seat. The method also includes the step of establishing a seart design as a function of the established environment characteristics, the interface characteristics, and the body templates by defining a plurality of patches. The patch represents interaction between an area of the seat design and the body templates.

In another aspect of the present invention, a system for designing a seat is provided. The system includes a user interface for establishing a set of environment characteristics, a set of interface characteristics, and a pool of body templates. The pool of body templates are representative of target occupants of the seat. The system also includes a computer coupled to the user interface for establishing a seat design as a function of the established environment characteristics, interface characteristics, and body templates by defining a plurality of patches. The patches represent interaction between an area of the seat and the body templates.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

With reference to the drawings and in operation, a system 10 and method 20 for assisting in the design of a seat is provided. Generally, the system 10 and method 20 utilize a design template which may be implemented in software or as a physical structure (see below). The design template may include one or more torso sections. Such a design template is shown in U.S. Pat. No. 6,840,125 issued to Herbert M. Reynolds et al issued on Jan. 11, 2005, and U.S. Published Patent Application No. 20040011150, published on Jan. 22, 2004, both of which are hereby incorporated by reference.

Figure 1:
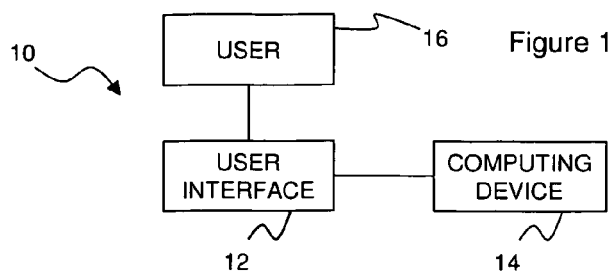
FIG. 1 is a block diagram of a system for establishing a patch related to a seat to be designed.

With specific reference to FIG. 1, in one embodiment, the system 10 may include a user interface 12 and a computing device 14. The computing device 14 may be a (stand-alone or networked) computer, such as a personal computer. The user interface 12 may a graphical user interface or GUI.

The computing device 14 is adapted to run a computer application or program which implements at least a portion of the system 10 or method 20. In one embodiment, the computer application or program is accessible from and interacts with another computer program, such as a CAD/CAM program.

A user 16 interacts with the user interface 12 to establish a set of environment characteristics, a set of interface characteristics, and a pool of body templates (see below). The pool of body templates are generally representative of target occupants of the seat. For example, in one embodiment the seat to be designed is for use in a motor vehicle such as an automobile. Thus, the pool of body templates are chosen to represent the target occupants of the motor vehicle or automobile. In one embodiment, the pool of body templates may include at least three different body templates, a small female, an average male, and a large male. Each body template may be provided with one of a set of postures, for example, slumped, neutral, and erect postures.

The computing device 14 is coupled to the user interface 12 for establishing a seat design as a function of the established environment characteristics, interface characteristics, and body templates by defining a plurality of patches 30 (see below). The patches 30 represent interaction between an area of the seat and the body templates (see below).

As discussed more fully below, each template includes one or more cross-sectional sections. In the illustrated embodiment, each template includes a cross-sectional section which directly correlates with a patch of the seat to be designed (see below).

In one embodiment, the patches 30 have a first state and a second state. The first state defines how the area of the seat will be deformed by the representative target occupants, i.e., defines the seat/occupant interface. The second state defines an undeflected state of the area of the seat.

Generally, in designing a seat more than one patch may be required. In one embodiment, the patch 30 may be one of a thigh patch, an ischial patch, and a back patch. The back patch may be a bite line patch, a lumbar patch, a chest patch, and a shoulder patch. In another embodiment, wherein the patch 30 is one of an ischial patch, a thigh support patch, a front of thigh patch, a nose of seat patch, a biteline patch, a lumbar patch, a chest patch, a shoulder patch, and a head restraint patch.

In one aspect of the present invention, the patches 30 are established relative to an anatomical reference point (see below).

In another aspect of the present invention, each patch 30 includes a two-dimensional cross section of the seat (see below). The cross-section may include first and second edge and the patch 30 may include a pair of bolsters located adjacent the first and second edges of the cross-section and separated there from by a pair of trenches (see below). In one embodiment, the patch 30 has a length, an insert width, a bolster height, a bolster width and a bolster angle. The patch 30 may also includes a maximum bolster penetration.

In one aspect of the present invention the patch is a contact patch defining an area of the seat which will be deformed by the representative target occupants. A second non-contact patch may also be established which defines an area of the seat which will be not deformed by any of the representative target occupants.

As described below, the environment characteristics may be related to an adjustment mechanism of the seat or the environment in which the seat will be located.

For example, the environment may be a motor vehicle. The motor vehicle may include a steering wheel. One or more of the environment characteristics may be related to the steering wheel which are taken into account in establishing the patch 30.

The environment characteristics may also include one or more heel reference points, an accelerator pedal length, an accelerator pedal width (see below).

In one aspect of the present invention, the interface characteristics are related to one or more of occupant joint angles, occupant-seat interaction, and/or vision targets.

Figure 2:
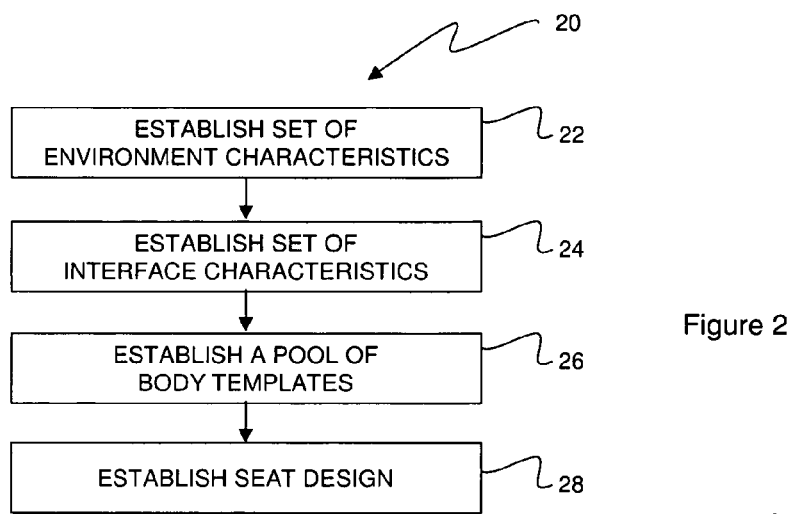
FIG. 2 is a flow diagram of a method of establishing a patch related to a seat to be designed.
Figure 3:
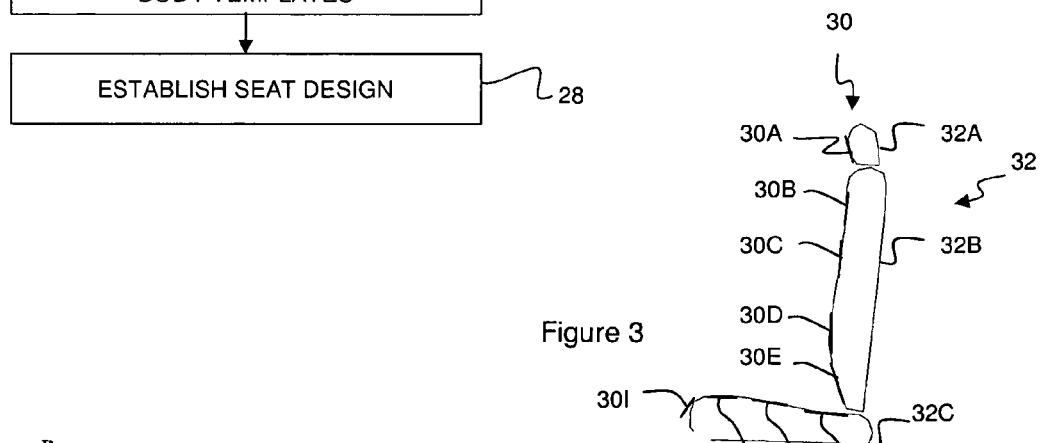
FIG. 3 is a side view of a seat and exemplary patches, according to an embodiment of the present invention.

With particular reference to FIG. 2, in another aspect of the present invention, a computer based method 20 for establishing one or more patches related to a seat to be designed for an environment is shown. In a first step 22, a set of environment characteristics are established. In a second step 24, a set of interface characteristics are established. In a third step 26, a pool of body templates are established. The pool of body templates are representative of target occupants of the seat. In a fourth step a patch of the seat is established as a function of the established environment characteristics, interface characteristics, and body templates, the patch representing interaction between an area of the seat and the body templates.

With particular reference to FIGS. 3-13, in one embodiment the system 10 and method 20 are used to define one or more patches 30 which may be used to design or evaluate a seat 32.

As described below, the system 10 and method 20 define the size of a patch insert area and a plane tangent to a wing or bolster for each patch. Patch width and wing/bolster position and orientation are important factors for occupant comfort as they relate to the design of the seat for vehicle performance. Landmarks on anatomical structures and surfaces of the human body can be used to define comfortable seat wings/bolsters for each region of the body. The blending of these wings/bolsters may then be used to form the 3D shape of the seat.

As discussed above, the system 10 and method 20 uses body templates from a pool of body templates. In the illustrated embodiment, each template includes eight transverse planes: one plane through the head which interacts with the head restraint, four planes on the torso which interact with the seatback, one under the buttocks which interacts with the seat cushion, two planes under each thigh which interact with the seat cushion and one point at the back of each calf which interacts with the nose of seat to define the length of the seat cushion. The transverse-planes represent the deflected shape of the body for a body seated in sitting postures and contain the relevant anatomical load-bearing structures and non load-bearing surfaces for each body template. In the illustrated embodiment, the pool includes at least three templates representing three different body sizes. In one embodiment each body size template is represented at three different spinal postures: erect, neutral and slumped.

In the illustrated embodiment, the system 10 and method 20 are used in the design of the seat 32, such as an automotive seat 32. However, it should be noted that the system 10 and method 20 are not limited to such. As shown, the automotive seat 32 may include a head rest 32A, a seat back 32B, and a seat cushion 32C.

As discussed below, the system 10 and method define a minimum and maximum seat insert width for each patch as appropriate for the seat design for vehicle performance. Furthermore, the system and method may also define a seat bolster shape based on the transverse-plane templates as appropriate for the seat design for vehicle performance.

In one embodiment, the system 10 and method 20 define a head restraint patch 30A and a shoulder patch 30B, a chest patch 30C, a lumbar patch 30D, and a biteline patch 30E on the seat back 32B based on load-bearing and non-load-bearing regions of the human body.

Additionally, the system 10 and method 20 may also define an ischium patch 30F, a thigh patch 30G, a front region of thigh patch 30H, and a nose of seat patch 30I, based on load-bearing and non-load-bearing regions of the human body.

Figure 4:
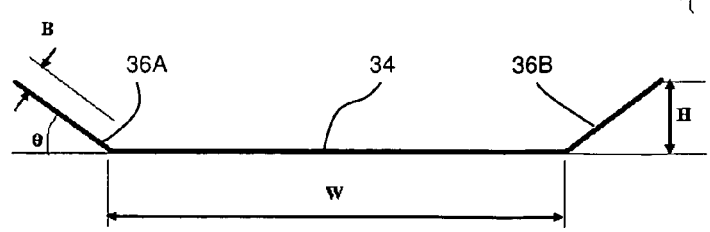
FIG. 4 is a top view of an exemplary patch, according to an embodiment of the present invention.
Figure 5:
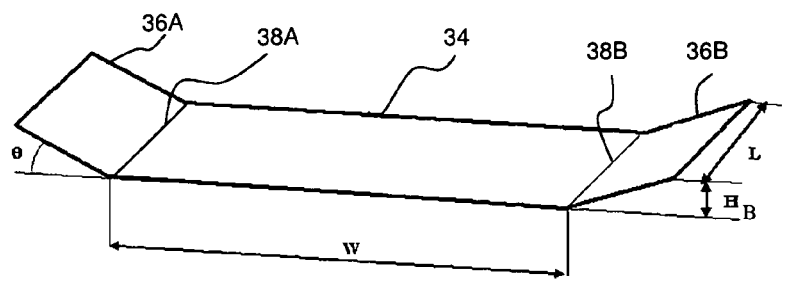
FIG. 5 is a rotated perspective view of the patch of FIG. 3.

With particular reference to FIGS. 4 and 5, each patch 30A-30H has a length (L), a width (W), a wing/bolster height (HB), a wing/bolster width (WB), and wing/bolster angle ($\Theta$).

In one embodiment, each patch is defined relative to a frame. The frame for the seat cushion has an overall length, width, anti-submarining plane, suspension or deadpan surface, and walls. The frame for the seat back has a height, width, torsion bar, and thickness. The limiting interactions of the patch with the frame are: 1) The closest distance from the patch to the frame must meet manufacturability, including wear and tear, criteria that depend on the materials used to create the seat pads. In one embodiment of a seat, the pad consists of polyurethane foam, with trim attached to produce a finished product. For structural integrity in manufacturing and use, the polyurethane foam must have a minimal thickness. 2) The distance from the patch to the frame and the stiffness of the pad locates the surface of the template that penetrates the patch. The template surface that penetrates the patch must meet the limit of meat-to-metal distance which is the closest distance from the template surface to the frame. 3) The length, height, width and thickness of the frame limit the length, width and height of the seat that the frame supports.

The patch lengths (L) are defined by the population or pool of occupants for which the seat 32 is designed. The patch widths, bolster heights, bolster widths, and angles are defined below. Each patch has leading and trailing edges which for the cushion are the front and rear of the patch and for the back are the top and bottom of the patch respectively.

Each patch 30A-30I may also include a maximum bolster penetration, or bolster approach to the occupant (B).

With particular reference to FIGS. 4 and 5, the undeflected surface of the seat surface is represented by an insert region 34, and first and second bolster guide regions 36A, 36B. First and second trenches 38A, 38B separate the insert region 34 from the first and second bolster guide regions 36A, 36B, respectively. In one embodiment, the width of the seat patch is equal for the leading and trailing edges thereby making the first and second trenches 38A and 38B parallel. In a second embodiment, the width of the leading and trailing edges may differ thereby making the first and second trenches 38A and 38B non-parallel. For the bolster guides, one embodiment treats the three variables of bolster height, bolster width and angle on the leading and trailing edges symmetrically and equal. In a second embodiment, the bolster guide variables may be non-symmetrical and unequal in value at both leading and trailing edges. Penetration of the body into the seat 32 is represented as the deflection "D" (see FIG. 6). Bolster penetration (B), is the greatest penetration into the body as measured along the shortest line from the bony structure to the body surface. Bolster penetration in FIG. 8, although illustrated as perpendicular to the bolster guide, does not have to be measured perpendicular to the bolster guide. Bolster approach (A), is the minimal distance from the body as measured from a line perpendicular to the bolster guideline. This represents the case where bolster penetration is not expected or designed for. For example, the shoulder patch 30 is not a load-bearing patch. As a result, the design criteria for that patch is recommended to have the patch no closer than a minimal tolerance to the body surface. This minimal tolerance distance is termed the "bolster approach".

In one embodiment, the system 10 or method 20 determines the parameters of the patch according to predetermined rules.

Figure 6:
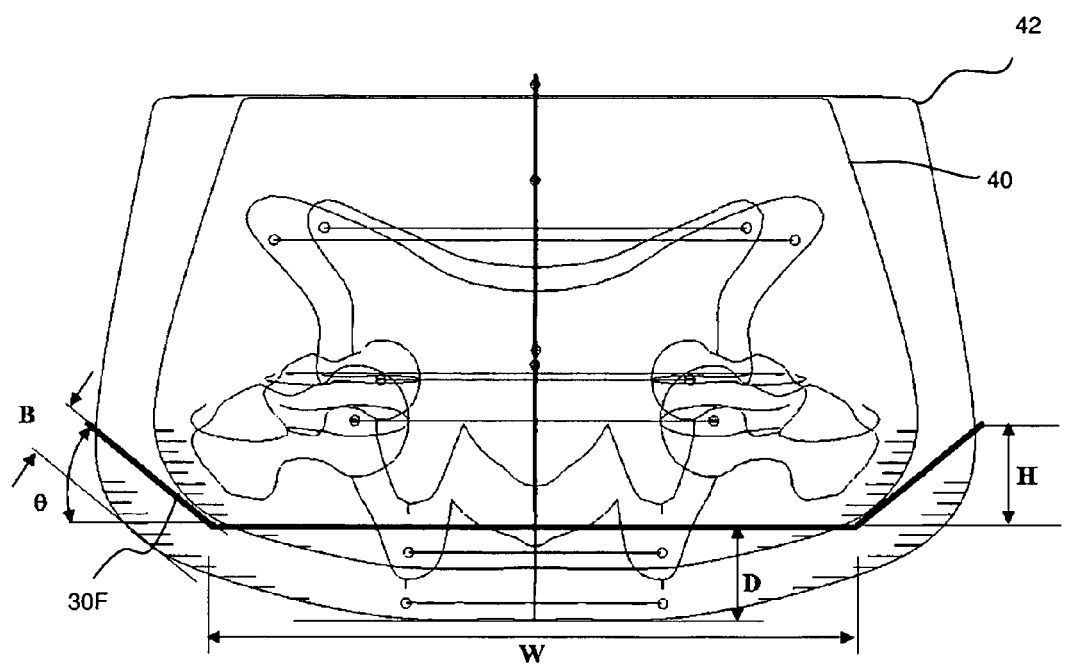
FIG. 6 is an illustration of an Ischial cross-sectional cross-section of the large male template and the small female template and an Ischial patch 30I, according to an embodiment of the present invention.
Figure 7:
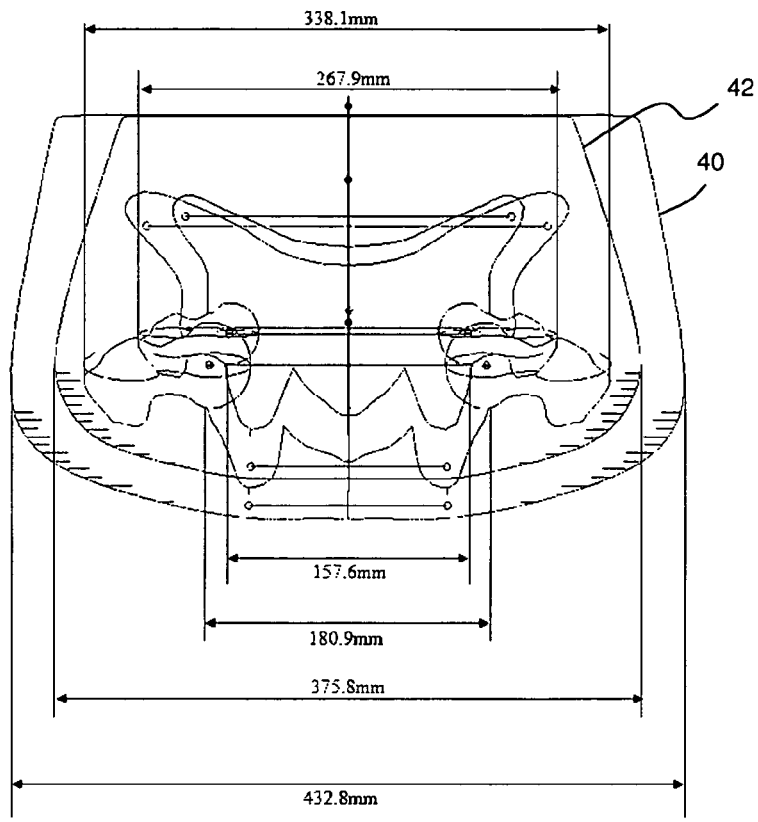
FIG. 7 is an illustration of an Ischial cross-sectional section of the large male template and the small female template.
Figure 8:
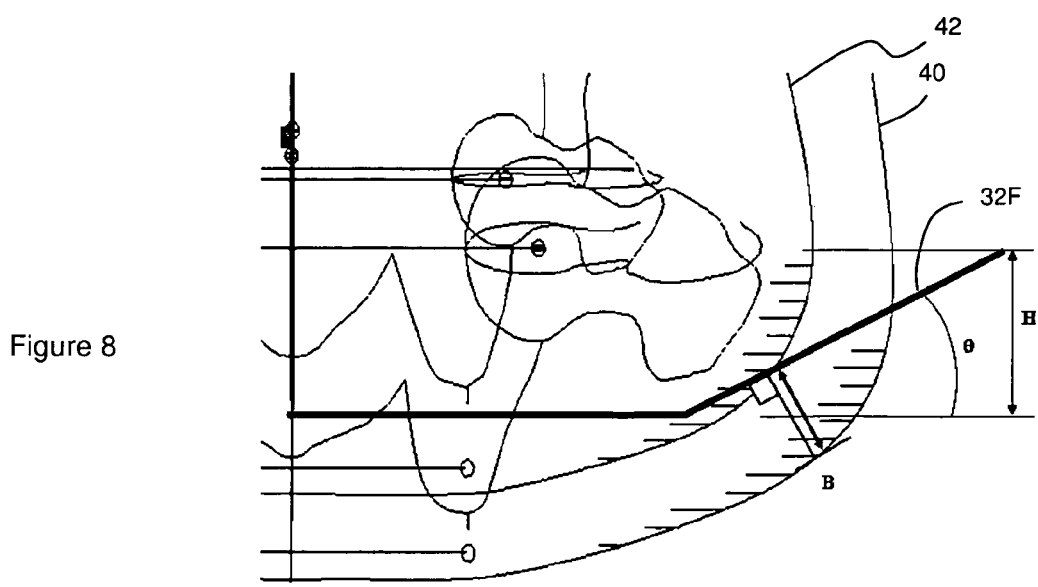
FIG. 8 is an exploded view FIG. 6.

With reference to FIGS. 6-8, in one embodiment the minimal Ischial patch insert width should always be at least equal to or slightly greater than the maximal breadth of the ischial tuberosities of the largest occupant pelvis for which the seat is to be designed. The projected acetabular rim intersection with the head of the femur at the hip joint on the transverse section provides a landmark that meets these requirements. For example, in FIGS. 6 and 7, each template includes one or more cross-sectional sections, including a cross-section section of the pelvis at the Ischial point. In the illustrated embodiment, exemplary Ischial cross-sectional section of the large male template 40 and the Ischial cross-sectional section of the small female template 42 are shown and compared in FIG. 7. In FIG. 6, the Ischial cross-sectional sections of the large male and small female templates 40, 42 are over-laid. The dimensions of the Ischial patch 30F are determined by the dimensions of the large male template and the small female template.

Similarly, the maximum insert width of the Ischial patch 30F is defined by one of two choices, the smallest occupant ischial transverse-plane template deformed tissue width or largest occupant ischial transverse-plane template width at the greater trochanters.

The ischial patch bolster angle, $\Theta$, is defined as a function of the maximum allowable bolster penetration (B in FIGS. 6 and 8) by any occupant for which the seat is designed.

The maximum allowable bolster penetration (FIG. 8) for each occupant is defined as a proportion of less than one of the maximum seat patch transverse-plane section penetration of the occupant at the patch centerline (D in FIG. 6). This bolster penetration is measured on the shortest line from the greater trochanter of the femur to the body surface.

The maximum bolster angle is the angle for which the penetration at the bolster for all occupants is less than the maximum allowable bolster penetration as measured on a line perpendicular to the bolster guide to the transverse-plane template.

The ischial patch bolster angle minimum is defined by an angle of zero.

The maximum ischial patch bolster height is defined by one of two possibilities: (1) the maximal penetration of the bolster has been achieved for one or more occupants and the height cannot be increased or (2) the height is such that the resulting total width of the bolsters and insert exceeds the width of the largest occupant for which the seat is being designed by a proportion of the width of the largest occupant transverse-plane template.

The ischial patch bolster height minimum is defined by a height of zero.

Figure 9:
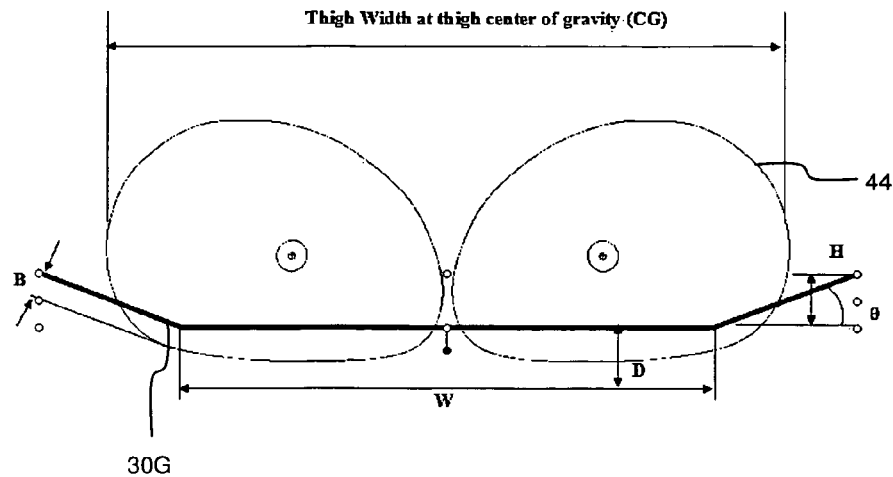
FIG. 9 is an illustration of a thigh cross-sectional section and a thigh patch, according to an embodiment of the present invention.

With reference to FIG. 9, the thigh center of graph patch 30G along with an exemplary set of thigh cross sections 44 is shown. The minimum thigh patch insert width is defined as a proportion of the smallest occupant thigh width at the thigh cross-section or as a proportion of the ischial patch insert width. The maximum thigh patch insert width is defined as a proportion of the largest occupant thigh width at the thigh cross-section or as a proportion of the ischial patch insert width. The thigh patch bolster angle is defined as a function of the maximum allowable bolster penetration by any occupant for which the seat is designed, measured on a line in the direction from the femur to the body surface.

The maximum allowable bolster penetration for each occupant is defined as a proportion less than or equal to one of the maximum transverse-plane section penetration of the occupant at the patch insert region (W in FIG. 9).

The maximum bolster angle is the angle for which the penetration at the bolster for all occupants is less than the maximum allowable bolster penetration as measured on the shortest line from the femur to the body surface of the transverse-plane template.

The thigh patch bolster angle minimum is defined by an angle of zero.

The maximum thigh patch bolster height is defined by one of two possibilities (1) the maximal penetration of the bolster has been achieved for one or more occupants and the height cannot be increased or (2) the height is such that the resulting total width of the bolsters and insert exceeds the width of the largest occupant for which the seat is being designed by a proportion of the width of the largest occupant transverse-plane template.

The maximum height of the thigh patch bolster leading edge should not exceed the ischial patch bolster maximum height. The thigh patch bolster height minimum is defined by a height of zero.

The minimum front of thigh patch insert width is defined as a proportion of the smallest occupant thigh width at the front of thigh or as a proportion of the thigh patch insert width.

The maximum front of thigh patch insert width is defined as a proportion of the largest occupant thigh width at the front of thigh or as a proportion of the thigh patch insert width.

The front of thigh patch bolster angle maximum is defined as a function of the maximum allowable bolster penetration by any occupant for which the seat is designed.

The maximum allowable bolster penetration for each occupant is zero.

The maximum bolster angle is the angle for which the penetration at the bolster for all occupants is less than the bolster penetration at the thigh bolster.

The front of thigh patch bolster angle minimum is defined by an angle of zero.

The maximum front of thigh patch bolster height is defined by one of two possibilities: (1) the maximal penetration of the bolster has been achieved for one or more occupants and the height cannot be increased, or (2) the height is such that the resulting total width of the bolsters and insert exceeds the width of the largest occupant for which the seat is being designed by a proportion of the width of the largest occupant thigh at the front of thigh patch.

The maximum height of the front of thigh patch bolster should be less than the thigh patch bolster height.

The front of thigh patch bolster height minimum is defined by a height of zero.

Figure 10:
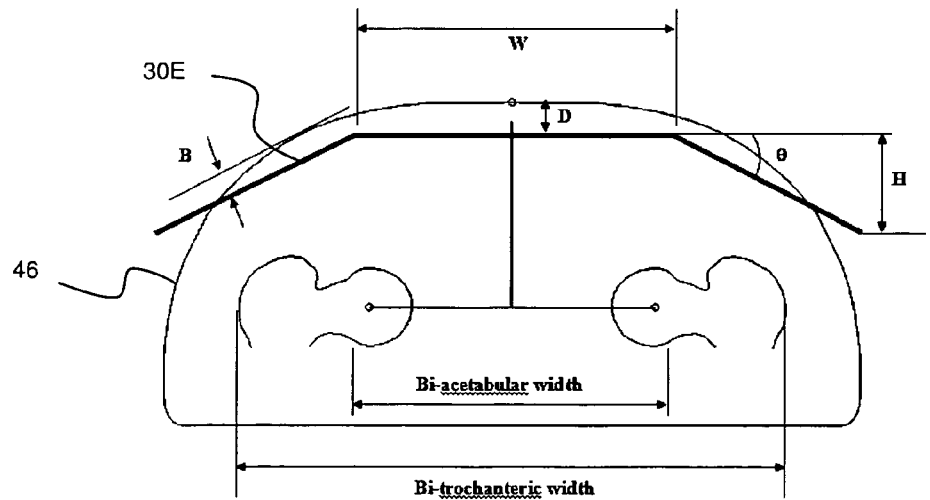
FIG. 10 is an illustration of a biteline cross-sectional section and a biteline patch, according to an embodiment of the present invention.

With reference to FIG. 10, the biteline patch 30E along with an exemplary biteline cross-sectional section 46.

The minimum patch width is defined as a proportion of the smallest occupant bi-acetabular width at the biteline patch cross-sectional section 46 or as a proportion of the ischial patch insert width.

The maximum patch insert width is defined as a proportion of the largest occupant bi-trochanteric width at the biteline patch cross-sectional section 46 or as a proportion of the ischial patch insert width.

The patch bolster angle maximum can also be defined as a function of the minimal bolster approach for any occupant for which the seat is designed.

The minimal bolster approach (B in FIG. 10) is defined as a minimal distance between the bolster guide region and the occupant.

The maximum bolster angle is the angle of minimal bolster approach, as measured on a line perpendicular to the bolster guide to the transverse-plane template (FIG. 10).

The patch bolster angle minimum is defined by an angle of zero.

The maximum patch bolster height is such that the resulting total width of the bolsters and insert width exceeds the width of the largest occupant for which the seat is being designed by a proportion of the width of the largest occupant transverse-plane template.

The patch bolster height minimum is defined by a height of zero.

Figure 11:
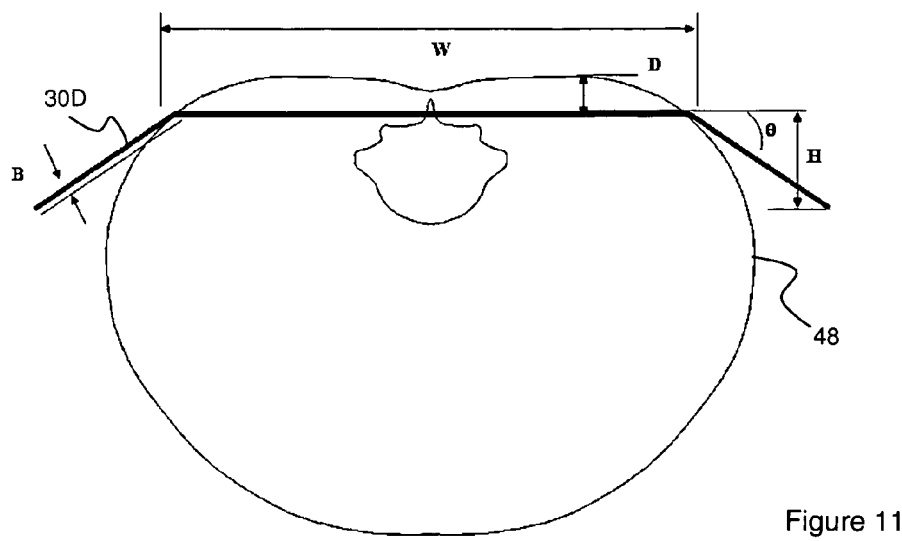
FIG. 11 is an illustration of a lumbar cross-sectional section and a lumbar patch, according to an embodiment of the present invention.

With reference to FIG. 11, the lumbar patch 30D along with an exemplary lumbar cross-sectional section 48 is shown.

The minimum patch insert width of the lumbar patch 30D is defined as a proportion of the smallest occupant width at the cross-section or as a proportion of the biteline width. The maximum patch insert width is defined as a proportion of the largest occupant width at the cross-section or as a proportion of the biteline width.

The patch bolster angle maximum can be defined as an angle parallel to the rib cage angle for the largest occupant.

The patch bolster angle maximum can also be defined as a function of the minimal bolster approach for any occupant for which the seat is designed.

The minimal bolster approach is defined as a minimal distance between the bolster guide region and the occupant (D in FIG. 11).

The maximum bolster angle is the angle for which the distance to the bolster for all occupants is less than the minimal bolster approach, as measured on a line perpendicular to the bolster guide to the ERL transverse-plane template.

The patch bolster angle minimum is defined by an angle of zero.

The maximum patch bolster height is defined such that the resulting total width of the bolsters and insert exceeds the width of the largest occupant for which the seat is being designed by a proportion of the width of the largest occupant transverse-plane template.

The patch bolster height minimum is defined by a height of zero.

Figure 12:
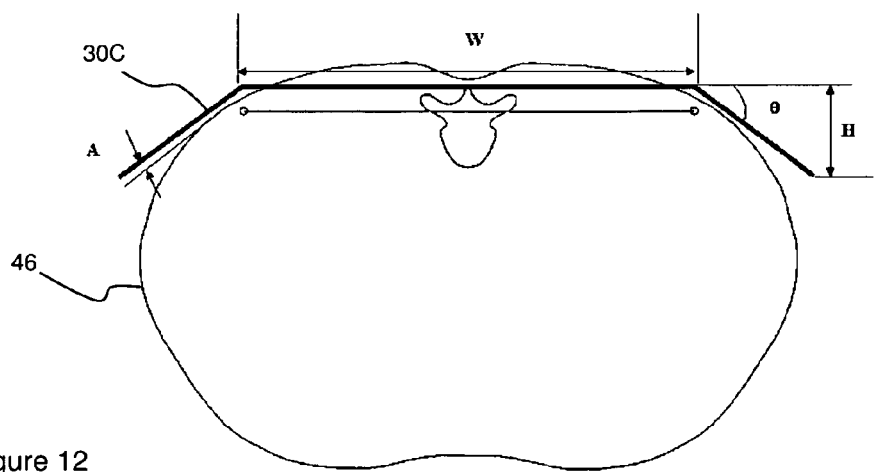
FIG. 12 is an illustration of a chest cross-sectional section and a chest patch, according to an embodiment of the present invention; and, FIG. 13 is an illustration of a shoulder cross-sectional section and a shoulder patch, according to an embodiment of the present invention.

With reference to FIG. 12, the chest patch 30C along with an exemplary chest cross-sectional section 50.

The minimum patch insert width of the chest patch 30C is defined as a proportion of the smallest occupant width at the cross-section or as a proportion of the lumbar width.

The maximum patch insert width is defined as a proportion of the largest occupant width at the cross-section or as a proportion of the lumbar patch insert width.

The patch bolster angle maximum can be defined as an angle tangent to, or in contact with the rib cage angle for the largest occupant.

The patch bolster angle maximum can also be defined as a function of the minimal allowable bolster approach for any occupant for which the seat is designed.

The maximum allowable bolster approach (A in FIG. 12) is defined as a minimal distance between the bolster guide region and the occupant.

The maximum bolster angle is the angle for which the distance to the bolster for all occupants is greater than the minimal bolster approach, as measured on a line perpendicular to the bolster guide to the ERL transverse-plane template.

The patch bolster angle minimum is defined by an angle of zero.

The maximum patch bolster height is defined such that the resulting total width of the bolsters and insert exceeds the width of the largest occupant for which the seat is being designed by a proportion of the width of the largest occupant transverse-plane template.

The patch bolster height minimum is defined by a height of zero.

Figure 13:
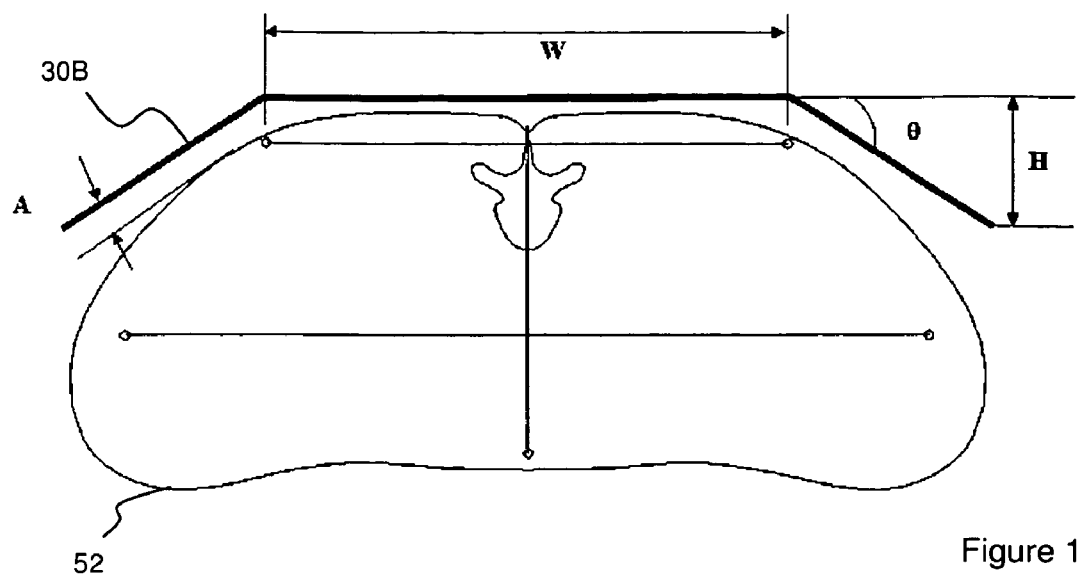

With reference to FIG. 13, the shoulder patch 30B along with an exemplary shoulder cross-sectional section 52 is shown.

The minimum width of the shoulder patch 30B is defined as a proportion of the smallest occupant shoulder joint width at shoulder cross-section. The maximum patch width is defined as a proportion of the largest occupant shoulder joint width at the shoulder cross-sectional section 52. The patch bolster angle maximum is defined as a function of the maximum allowable bolster approach to any occupant for which the seat is designed.

The maximum allowable bolster approach for each occupant is defined as a fixed minimal distance between the occupant and the bolster (A in FIG. 13).

The maximum bolster angle is the angle for which the distance from the bolster for all occupants is greater than the minimal allowable bolster approach as measured on a line perpendicular to the bolster guide to the transverse-plane template.

The patch bolster angle minimum is defined by an angle of zero.

The maximum patch bolster height such that the resulting total width of the bolsters and insert exceeds the width of the largest occupant for which the seat is being designed by a proportion of the width of the largest occupant transverse-plane template.

The patch bolster height minimum is defined by a height of zero.

Likewise, the head restraint patch 30A is established with respect to a section through the back of head of the body templates in the pool.

The minimum patch width of the head restraint patch 30A is defined as a proportion of the smallest occupant head width. The maximum patch width is defined as a proportion of the largest occupant head width. The patch bolster angle maximum is defined by the minimal allowable bolster interference for any occupant for which the seat is designed. The maximum allowable bolster height for each occupant is defined by the minimal allowable bolster interference for any occupant for which the seat is designed. The patch bolster angle minimum is defined by an angle of zero. The patch bolster height minimum is defined by a height of zero.

In one embodiment of the present invention, the output of the system 10 and method 20 is the patches 30A-30I. Based on the patches 30A-30I, the seat 32 can be designed to the requirements defined by the patches 30A-30I.

In a more specific embodiment, the system 10 and method 20 are implemented in a computer program application which is accessible as a tool in a CAD package, such as the Unigraphics CAD software package available from UGS of Plano, Tex. In this embodiment, the system 10 and method 20 are adapted to be used in the design of an automotive seat. Although present invention is not limited to such application.

In one embodiment, method 20 is a CAD integrated non-linear mathematical optimization algorithm for seat design in any seated workstation environment. It begins with the preferred occupant position in the workstation geometry, e.g. an automobile vehicle package. The preferred seated position of the occupant is based upon the joint angles required to achieve a body position that optimally fits the task geometry. In the automotive driver's position, this geometry is defined by the location of the pedals, steering wheel and position of the eye for optimal vision of the road and all controls. The seat should support the occupant in the preferred position such that each occupant's limb and spinal postures (i.e. joint angles) are met.

In the system 10 and method 20, the vehicle geometry may be input by the user 16 or loaded from a file that contains this geometry based upon vehicles that have been previously measured as benchmark geometries. Upon defining this vehicle geometry that defines whether the vehicle is a sedan or SUV, for example, the software will optimize the seat shape and mechanism that best supports and fits all occupants that will operate the vehicle. These occupants range in size from the small female to the large male, each sitting in a range of back postures from slumped to erect. For the population domain defined by the user, the seat will accommodate the range of variation in the population thereby designing one seat that fits all people.

To design a seat that fits all body sizes and postures in all body sizes, a definition of the seat surface was defined that uses comparable landmarks from all occupants. The use of occupant anatomy gives a frame of reference for the seated occupant that is shared. Since the anatomy selected is functionally related to the biomechanics of sitting postures, the seat surface can be divided into comparable seat patches that interact in the same manner with the occupant's body regardless of size or posture. Thus, the seat patch represents the shared area between all occupants of different size and posture. By fitting the unoccupied sitting surface through these shared patch areas, a seat is designed by fits all body sizes and postures.

The user 16 does not have to identify the body landmarks, size or posture of the occupants since these definitions are built into the ERL occupants. The user 16, however, must define the proportion of occupants in the population that the vehicle is targeted to use. In addition, the definition of the seat patch is calculated by the software. The user, however, has to input the type of vehicle through defining the basic geometric layout of the floor, pedal, steering wheel, mirror and headliner. The software then calculates the optimal position for each size and posture to fit the layout selected by the user. The seat is developed as a result of a biomechanical model that calculates weight distribution in the seated occupant and input for the mechanical properties of the seat that deform under the load of the occupant. When the seat is unloaded, the design of the shape of the seat that must be built to fit this population is established.

ELEMENT LIST 10 system
12 user interface
14 computing device
16 user
20 method
22 first step
24 second step
26 third step
28 fourth step
30 patch
30A head restraint patch
30B shoulder patch
30C chest patch
30D lumbar patch
30E biteline patch
30F Ischial patch
30G thigh center of gravity patch
30H front region of thigh patch
30I nose of seat patch
32 seat, automotive seat
32A head rest
32B seat back 32C seat cushion
34 insert region
36A first bolster guide region
36B second bolster guide region
38A first trench
38B second trench
40 Ischial cross-sectional section of the large male template
42 Ischial cross-sectional section of the small female template
44 thigh cross-sectional section
46 biteline cross-sectional section
48 lumbar cross-sectional section
50 chest cross-sectional section
52 shoulder cross-sectional section

What is claimed is:

1. A computer based method for designing a seat for use in an environment, comprising:
   establishing a set of environment characteristics;
   establishing a set of interface characteristics;
   establishing a pool of body templates, the pool of body templates being representative of target occupants of the seat;
   establishing a seat design as a function of the established environment characteristics, interface characteristics, and body templates by defining a plurality of patches, the patches representing interaction between an area of the seat and the body templates and defining a surface of the seat design, each patch having a length, a width, a bolster height, a bolster width and a bolster angle;
   storing the seat design as a tool to be used in a CAD package; and,
   allowing a user of the CAD package to use the tool to design and/or evaluate an actual seat.

2. A computer based method, as set forth in claim 1, wherein at least one of the patches has a first state and a second state, the first state defining how the area of the seat will be deformed by the representative target occupants, the second state defining an undeflected state of the area of the seat.

3. A computer based method, as set forth in claim 1, wherein at least one of the patches is a cushion patch.

4. A computer based method, as set forth in claim 3, wherein the cushion patch is one of a nose of seat patch, front of thigh patch, thigh patch, and an ischial patch.

5. A computer based method, as set forth in claim 1, wherein at least one of the patches is a back patch.

6. A method, as set forth in claim 5, wherein the back patch is one of a bite line patch, a lumbar patch, a chest patch, a shoulder patch, and a head restraint patch.

7. A computer based method, as set forth in claim 1, wherein at least one of the patches is one of an ischial patch, a thigh support patch, a front of thigh patch, a nose of seat patch, a bite line region patch, a lumbar patch, a chest patch, a shoulder patch, and a head restraint patch.

8. A computer based method, as set forth in claim 1, wherein at least one of the patches is established relative to an anatomical reference point.

9. A computer based method, as set forth in claim 1, wherein the patches include a two-dimensional cross section of the seat.

10. A computer based method, as set forth in claim 9, wherein the cross-section includes first and second edges, the patch including a pair of bolsters located adjacent the first and second edges of the cross-section and being separated therefrom by a pair of trenches.

11. A computer based method, as set forth in claim 1, the patch further including a maximum bolster penetration.

12. A computer based method, as set forth in claim 1, wherein one of the patches is a contact patch defining an area of the seat which will be deformed by the representative target occupants and another of the patches is a non-contact patch defining an area of the seat which will be not deformed by any of the representative target occupants.

13. A computer based method, as set forth in claim 1, wherein the environment characteristics are related to an adjustment mechanism of the seat.

14. A computer based method, as set forth in claim 1, wherein the environment characteristics are related to an environment in which the seat will be located.

15. A computer based method, as set forth in claim 14, wherein the environment is a motor vehicle.

16. A computer based method, as set forth in claim 15, wherein the motor vehicle includes a steering wheel, at least one of the environment characteristics being related to the steering wheel.

17. A computer based method, as set forth in claim 1, wherein the environment characteristics include one or more of a heel reference point, an accelerator pedal length, an accelerator pedal width.

18. A computer based method, as set forth in claim 1, wherein the interface characteristics are related to one or more of occupant joint angles, occupant-seat interaction, and vision targets.

19. A computer based method, as set forth in claim 1, wherein the patches are established as a function of a set of predetermined manufacturability criteria.

20. A system for establishing one or more patches related to a seat to be designed for an environment, comprising:
   a user interface for establishing a set of environment characteristics, a set of interface characteristics, and a pool of body templates, the pool of body templates being representative of target occupants of the seat; and
   a computing device coupled to the user interface for establishing a seat design as a function of the established environment characteristics, interface characteristics, and body templates by defining a plurality of patches, the patches representing interaction between an area of the seat and the body templates and defining the surface of the seat design, each patch having a length, a width, a bolster height, a bolster width and a bolster angle, the computing device for storing the seat design as a tool to be used in a CAD package and allowing a user of the CAD package to use the tool to design and/or evaluate an actual seat.

21. A system, as set forth in claim 20, wherein at least one of the patches has a first state and a second state, the first state defining how the area of the seat will be deformed by the representative target occupants, the second state defining an undeflected state of the area of the seat.

22. A system, as set forth in claim 20, wherein at least one of the patches is a cushion patch.

23. A system, as set forth in claim 22, wherein the cushion patch is one of a nose of cushion patch, a front of thigh patch, thigh patch, and an ischial patch.

24. A system, as set forth in claim 20, wherein at least one of the patches is a back patch.

25. A system, as set forth in claim 24, wherein the back patch is one of a bite line patch, a lumbar patch, a chest patch, a shoulder patch, and a head restraint patch.

26. A system, as set forth in claim 20, wherein one of the patches is one of an ischial patch, a thigh support patch, a front of thigh patch, a nose of cushion patch, a biteline region patch, a lumbar patch, a chest patch, a shoulder patch, and a head restraint patch.

27. A system, as set forth in claim 20, wherein the patch is established relative to an anatomical reference point.

28. A system, as set forth in claim 20 wherein the each patch includes a two-dimensional cross section of the seat.

29. A system, as set forth in claim 28, wherein the cross-section includes first and second edges, each patch including a pair of bolsters located adjacent the first and second edges of the cross-section and being separated therefrom by a pair of trenches.

30. A system, as set forth in claim 20, the patch further including a maximum bolster penetration.

31. A system, as set forth in claim 20, wherein at least one of the patches is a contact patch defining an area of the seat which will be deformed by the representative target occupants and another of the patches is a non-contact patch defining an area of the seat which will be not deformed by any of the representative target occupants.

32. A system, as set forth in claim 20, wherein the environment characteristics are related to an adjustment mechanism of the seat.

33. A system, as set forth in claim 20, wherein the environment characteristics are related to an environment in which the seat will be located.

34. A system, as set forth in claim 33, wherein the environment is a motor vehicle.

35. A system, as set forth in claim 34, wherein the motor vehicle includes a steering wheel, at least one of the environment characteristics being related to the steering wheel.

36. A system, as set forth in claim 20, wherein the environment characteristics include one or more of a heel reference point, an accelerator pedal length, an accelerator pedal width.

37. A system, as set forth in claim 20, wherein the interface characteristics are related to one or more of occupant joint angles, occupant-seat interaction, and vision targets.

* * * * *